(12) United States Patent
Ward

(10) Patent No.: US 8,793,750 B2
(45) Date of Patent: Jul. 29, 2014

(54) METHODS AND SYSTEMS FOR FAST CHANNEL CHANGE BETWEEN LOGICAL CHANNELS WITHIN A TRANSPORT MULTIPLEX

(75) Inventor: Laurence Oliver Ward, Philadelphia, PA (US)

(73) Assignee: Sirius XM Radio Inc., New York, NY (US)

( * ) Notice: Subject to any disclaimer, the term of this patent is extended or adjusted under 35 U.S.C. 154(b) by 1012 days.

(21) Appl. No.: 12/184,023

(22) Filed: Jul. 31, 2008

(65) Prior Publication Data

US 2009/0161025 A1    Jun. 25, 2009

Related U.S. Application Data

(60) Provisional application No. 60/962,781, filed on Jul. 31, 2007.

(51) Int. Cl.
*H04N 7/173*    (2011.01)

(52) U.S. Cl.
USPC .............................................. 725/94; 725/95

(58) Field of Classification Search
USPC ...................................................... 725/94, 95
See application file for complete search history.

(56) References Cited

U.S. PATENT DOCUMENTS

| | | | |
|---|---|---|---|
| 6,490,001 B1 * | 12/2002 | Shintani et al. | 348/554 |
| 2004/0160974 A1 | 8/2004 | Read et al. | |
| 2005/0081244 A1 * | 4/2005 | Barrett et al. | 725/97 |
| 2005/0094733 A1 | 5/2005 | Daniell | |
| 2006/0085828 A1 * | 4/2006 | Dureau et al. | 725/100 |
| 2006/0126667 A1 * | 6/2006 | Smith et al. | 370/486 |

FOREIGN PATENT DOCUMENTS

WO    WO0057646 A1    9/2000

OTHER PUBLICATIONS

International Search Report and Written Opinion of the International Searching Authority, issued for corresponding PCT Application No. PCT/US2008/71819, dated Oct. 22, 2008.
European Search Report, Application No. 08796990, Dated Jan. 11, 2011.

\* cited by examiner

*Primary Examiner* — Nasser Goodarzi
*Assistant Examiner* — Hyun Hong
(74) *Attorney, Agent, or Firm* — Kramer Levin Naftalis & Frankel LLP

(57) ABSTRACT

A system, method and computer program product are provided for fast channel change between logical channels within a transport multiplex. By reducing the amount of time it takes to acquire and display a tuned channel, fast channel change can improve a viewer's experience. In exemplary embodiments of the present invention, a fast channel change system can simultaneously decode channel data for each channel in a transport multiplex, reconstruct all access units for each channel and send them out on their respective channel stream in the order that each access unit completes to a streamer, store and maintain a minimum amount of channel data in a buffer in each streamer, and output channel data from a streamer corresponding to a tuned channel to a media player. In exemplary embodiments of the present invention data can be input to a de-multiplexer and divided into separate video and audio streams prior to being input to the media player. Exemplary embodiments of the present invention can be utilized in various video applications, such as, for example, Sirius Satellite Radio's Backseat TV™ service.

21 Claims, 10 Drawing Sheets

Video Player With Fast Channel Change System Diagram

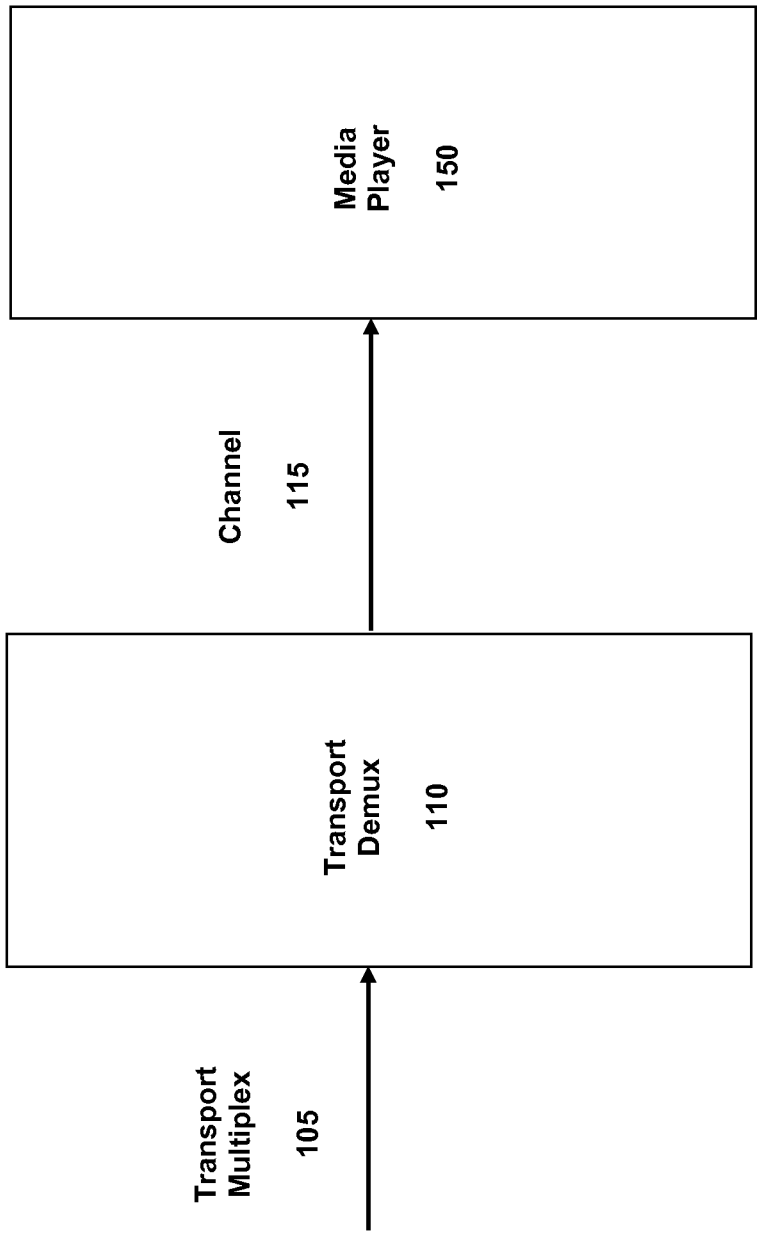

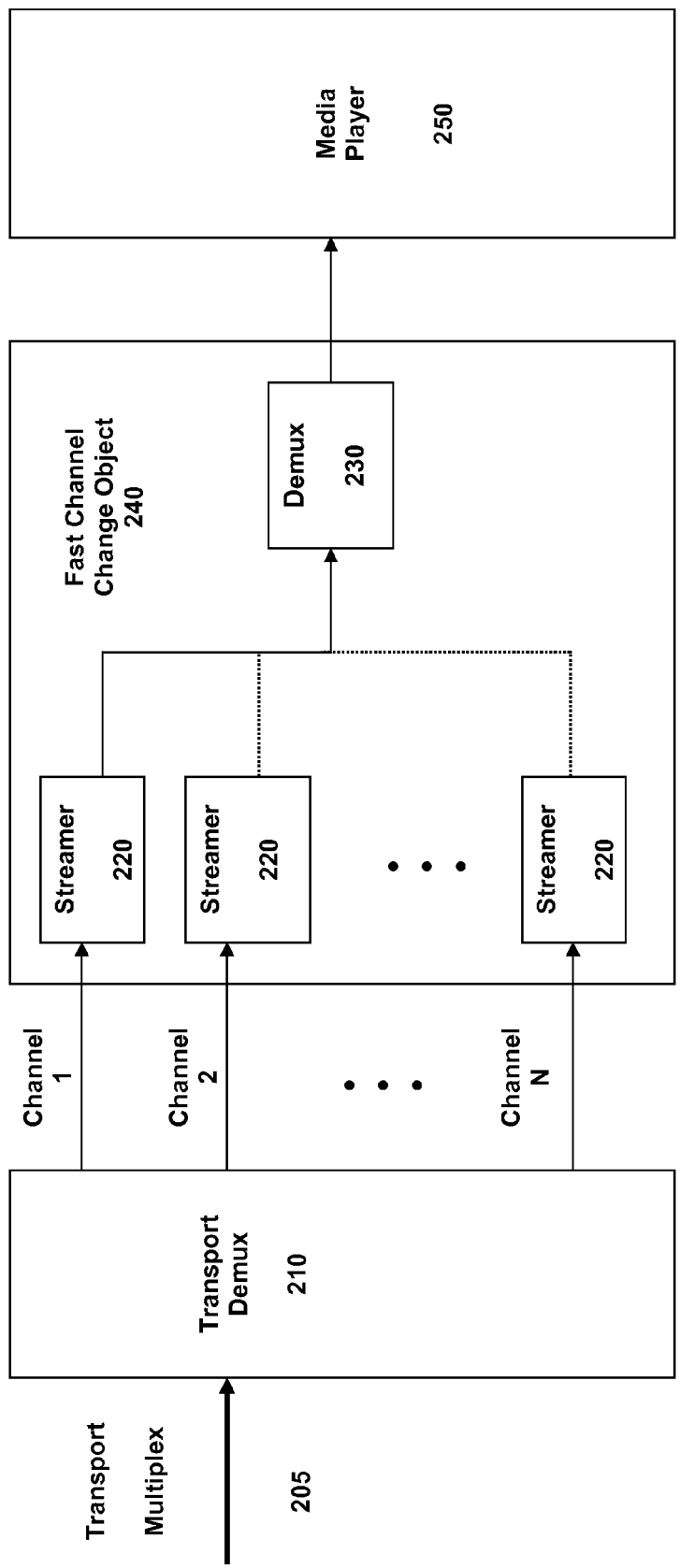
Fig. 2 – Video Player With Fast Channel Change System Diagram

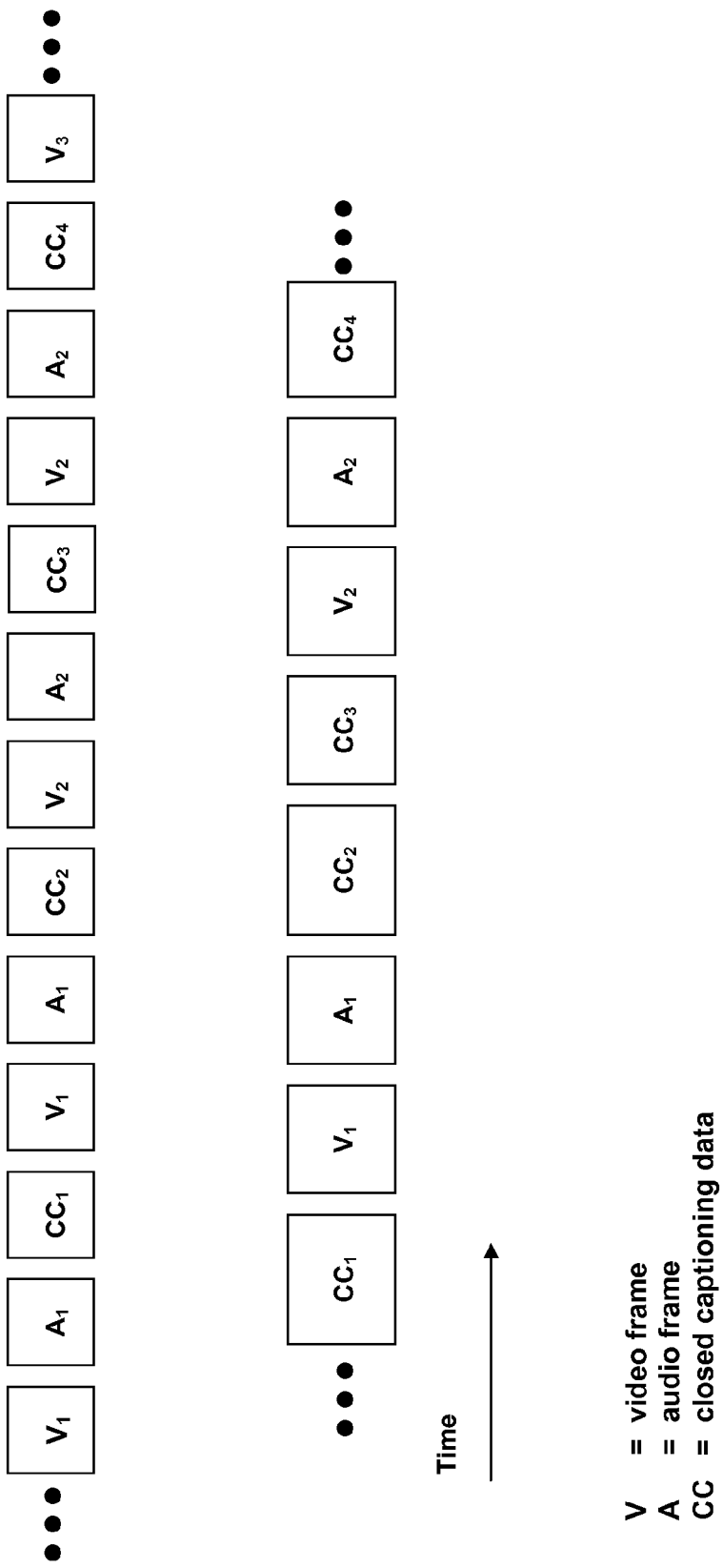
Fig. 3 – Packets (Top Stream) and Completed Access Units (Bottom Stream)

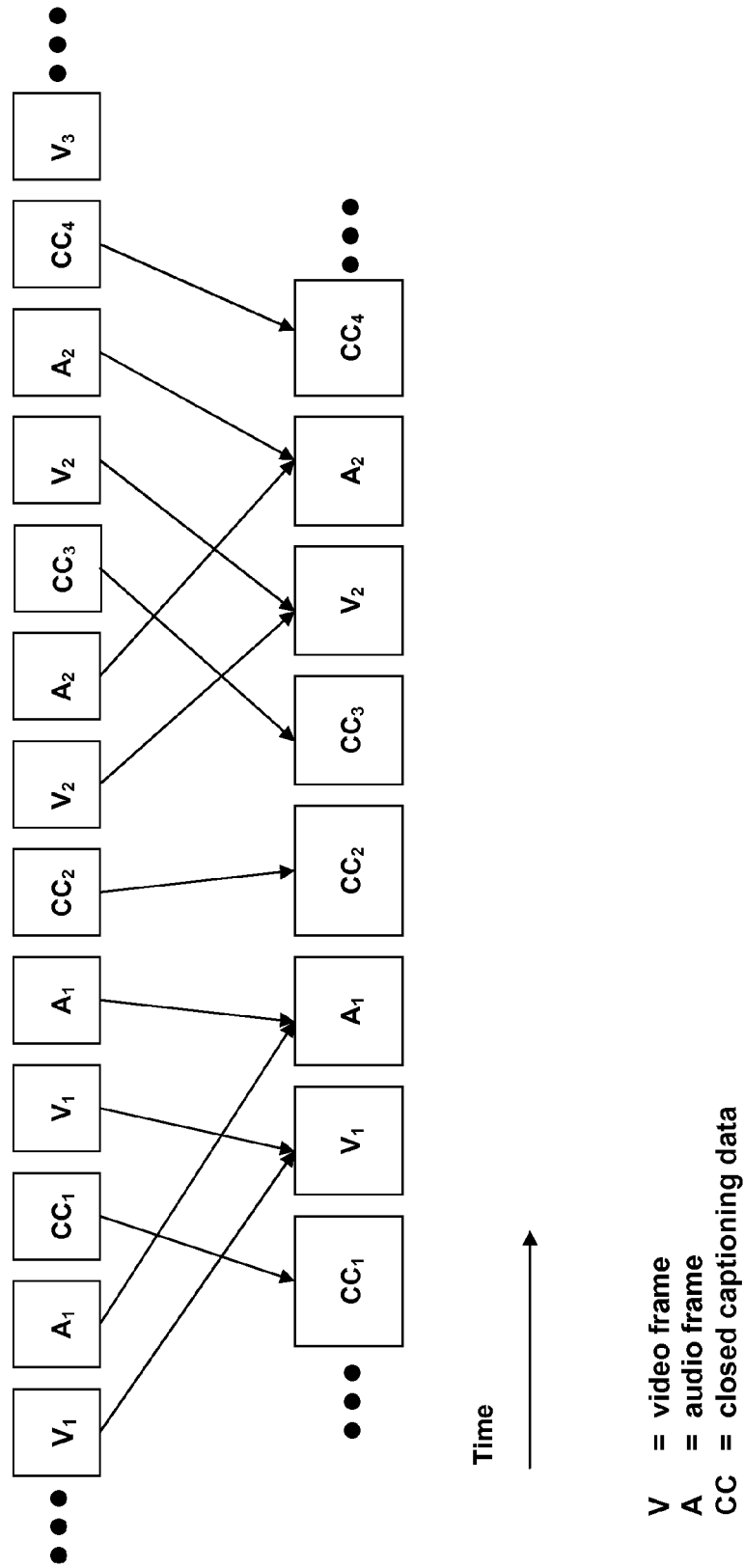
Fig. 3A – Packets Mapped To Their Respective Access Units

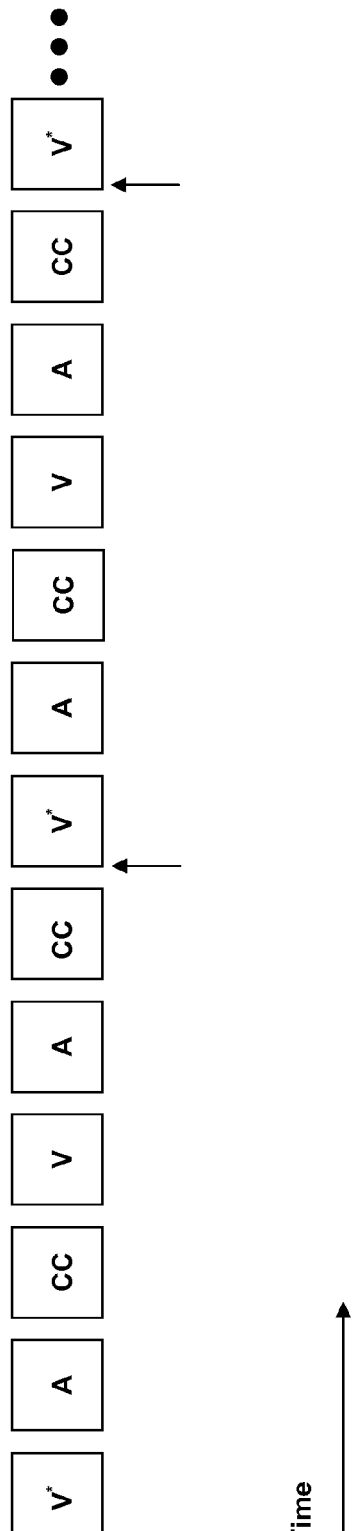
Fig. 4 – Key Frame Parking Algorithm

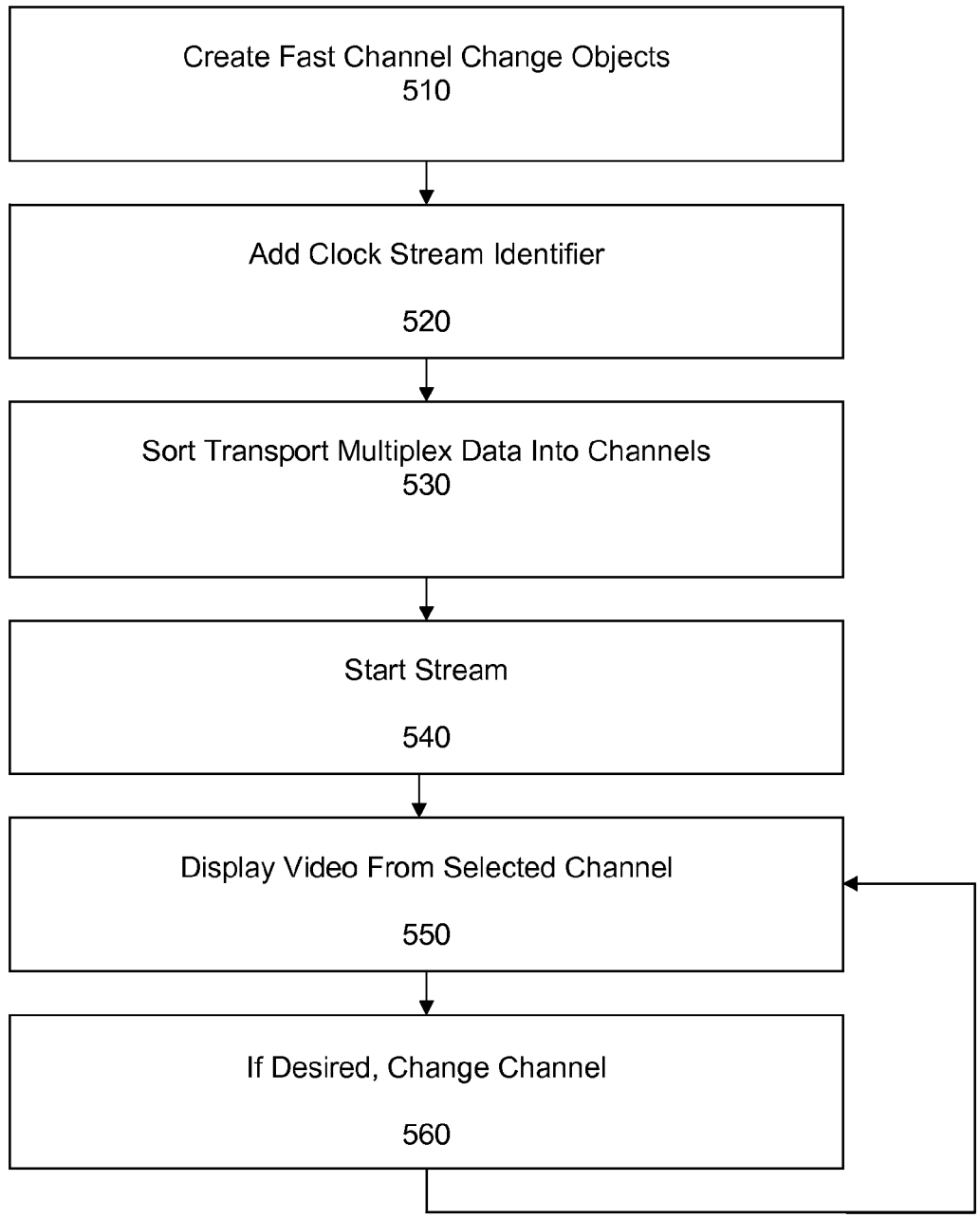
Fig. 5 – Overall FCC System Flow

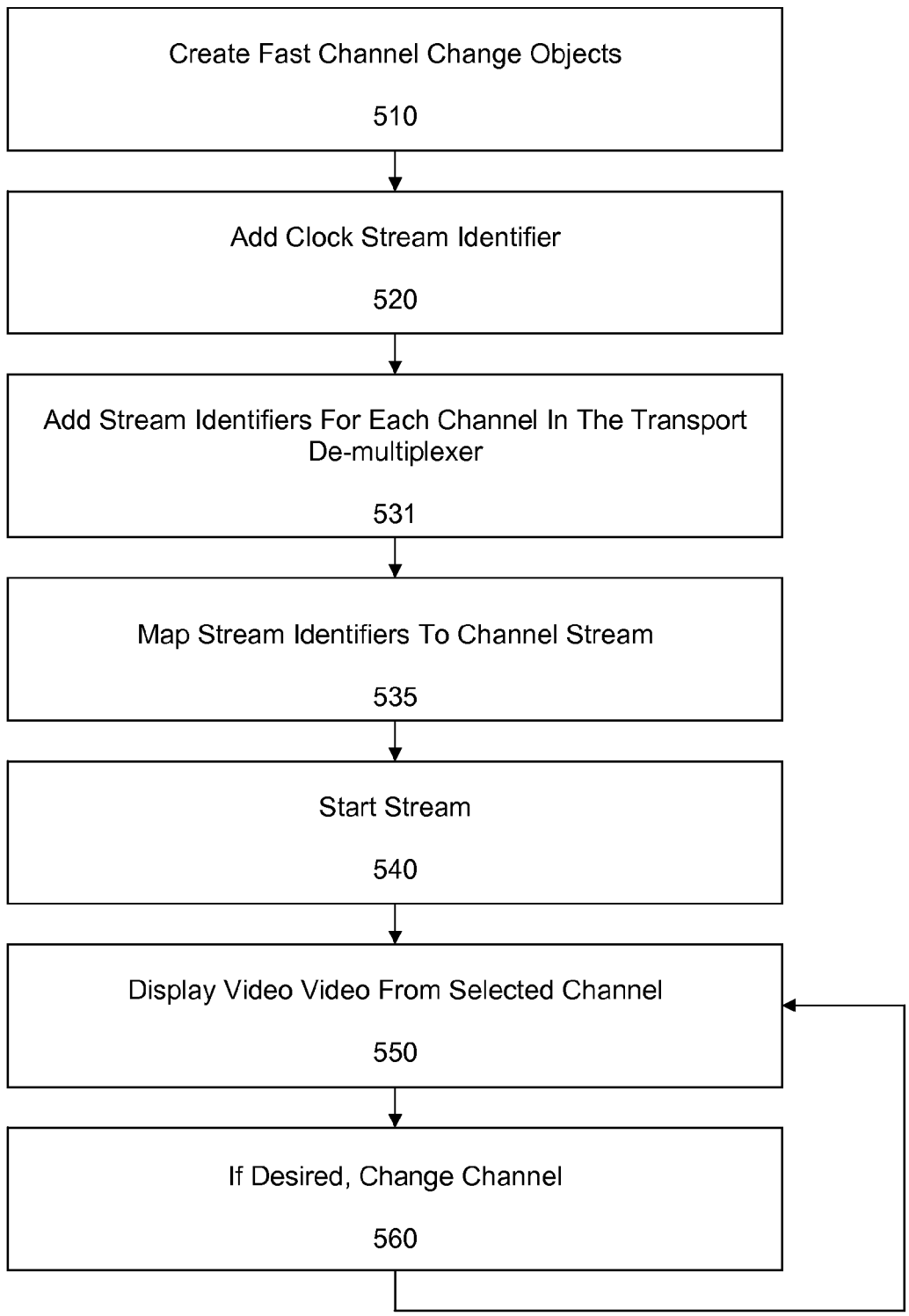
Fig. 5A – Overall FCC System Flow

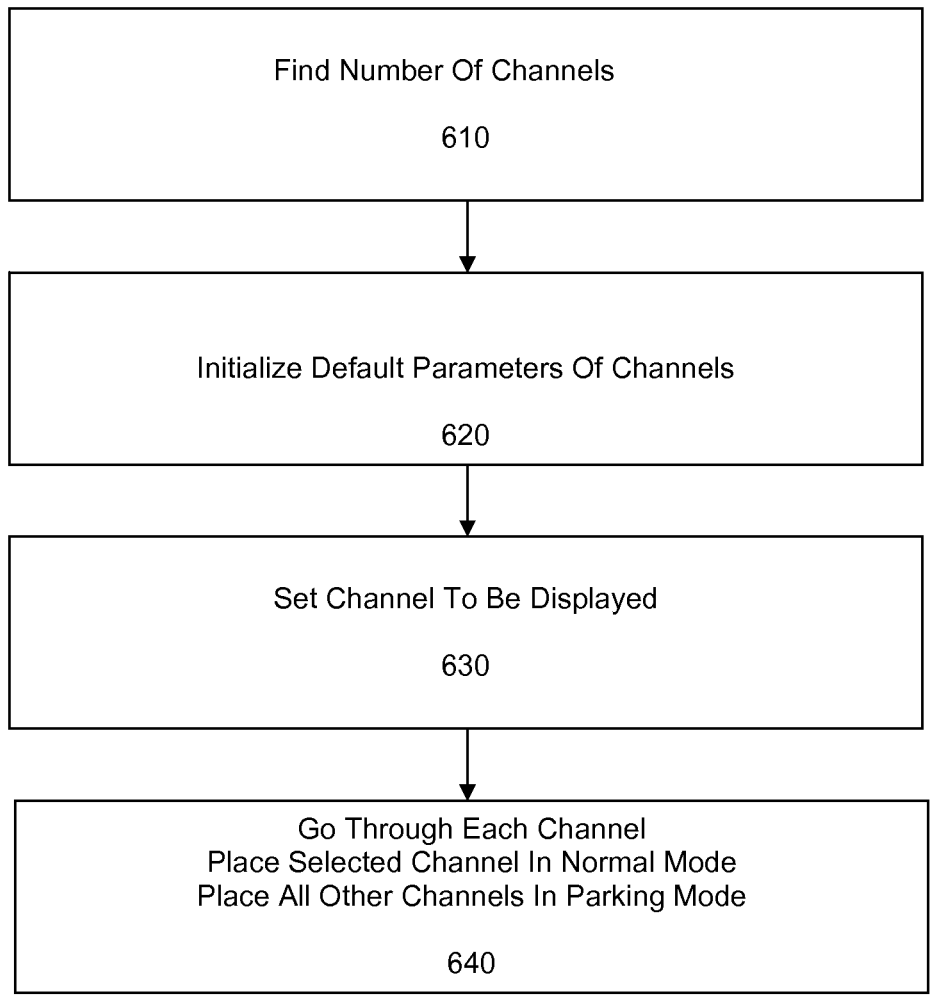
Fig. 6 – FCC Start Stream Sub-process

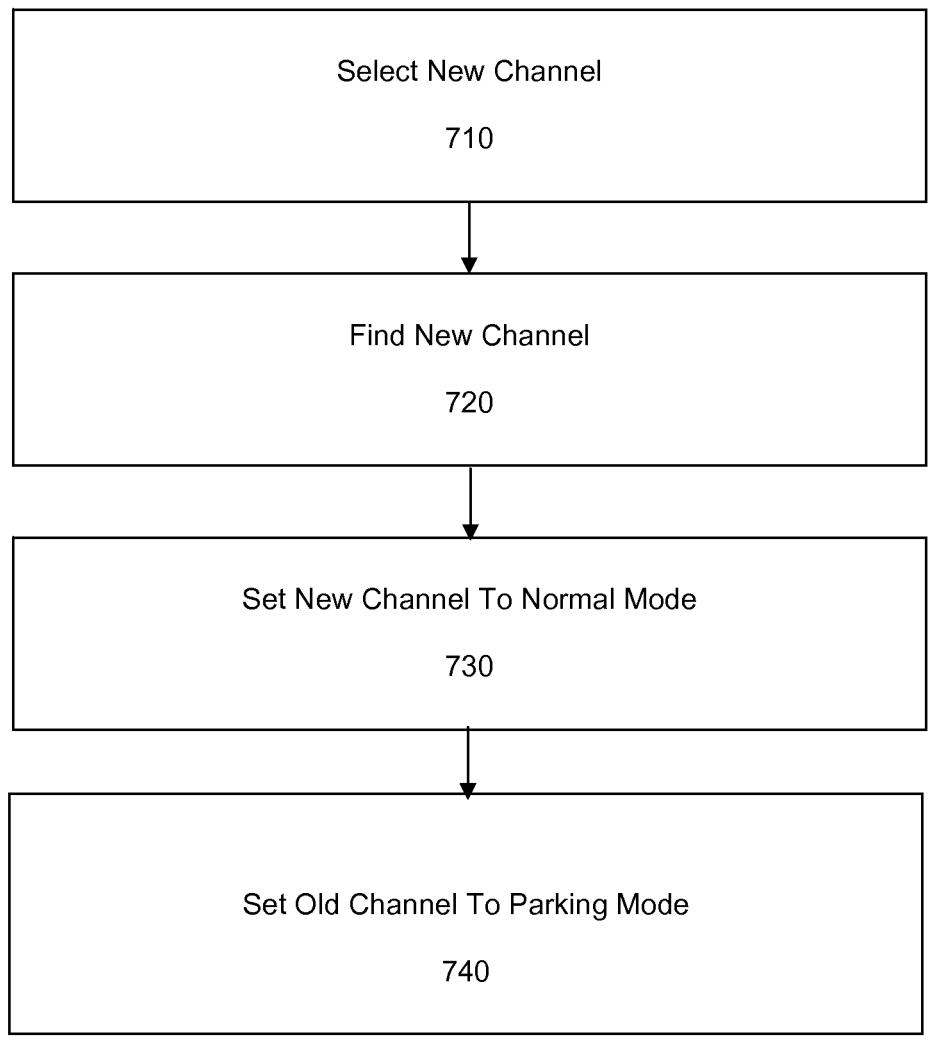
Fig. 7 – FCC Change Tune Sub-process

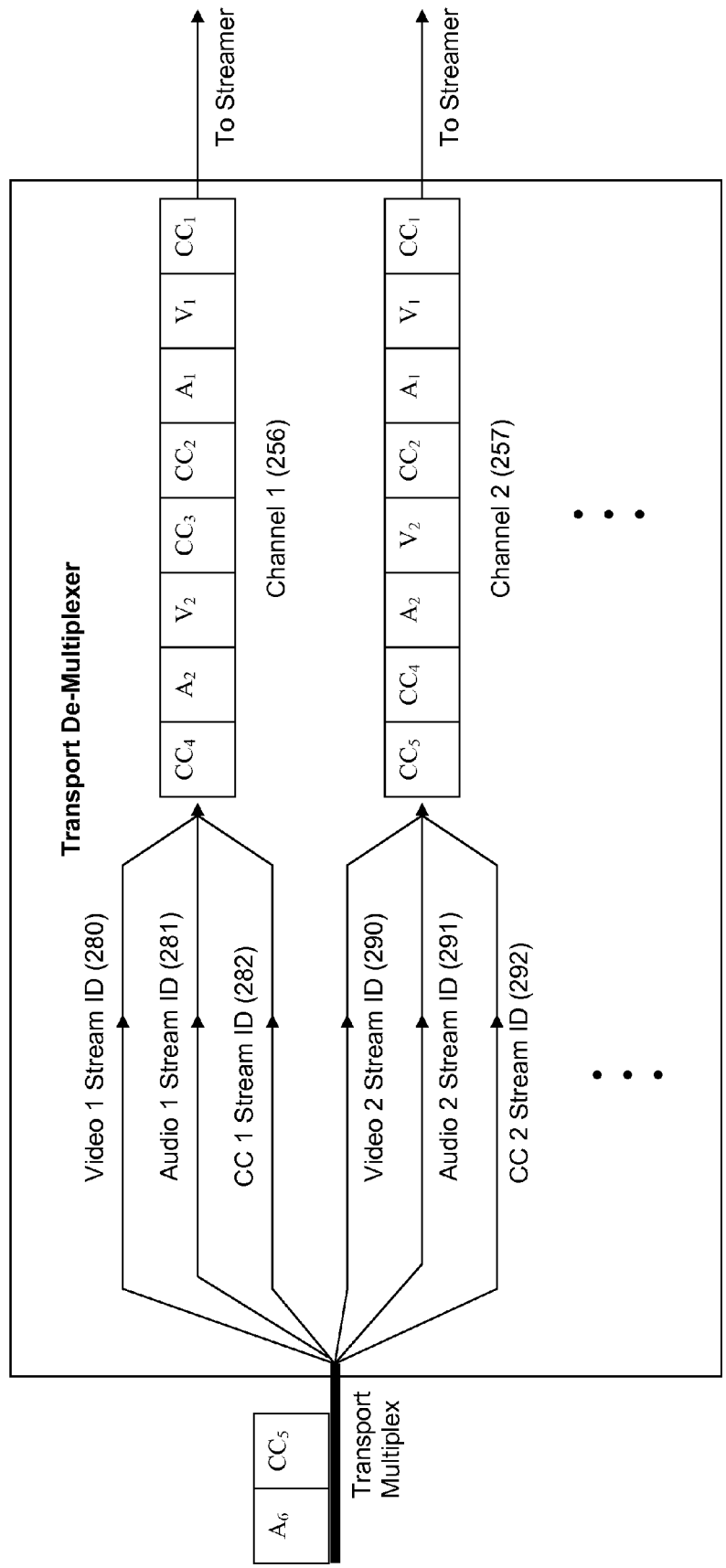
Fig. 8 – Detail Of Operation Of Exemplary Transport De-multiplexer

METHODS AND SYSTEMS FOR FAST CHANNEL CHANGE BETWEEN LOGICAL CHANNELS WITHIN A TRANSPORT MULTIPLEX

CROSS REFERENCE TO RELATED APPLICATIONS

This application claims the benefit of and hereby incorporates by reference U.S. Provisional Patent Application No. 60/962,781 entitled "METHODS AND SYSTEMS FOR FAST CHANNEL CHANGE BETWEEN LOGICAL CHANNELS WITHIN A TRANSPORT MULTIPLEX", filed on Jul. 31, 2007.

TECHNICAL FIELD

The present invention relates to satellite broadcast communications, and more particularly to systems and methods to facilitate fast channel change between logical channels within a transport multiplex.

BACKGROUND OF THE INVENTION

With the proliferation of video signals, such as, for example, in backseat video channels delivered via satellite to automobiles, it is in the interests of both broadcasters and video player providers to enhance, to the extent possible, a user's viewing experience to gain market advantage, create goodwill, and associate a pleasant viewing experience with their services. One way to enhance a viewer's experience is to reduce wait times, such as those often encountered when a user changes channels.

What is thus needed in the art are methods and systems to reduce the amount of time it takes to acquire and display a tuned channel within a transport multiplex.

SUMMARY OF THE INVENTION

A system, method and computer program product are provided for fast channel change between logical channels within a transport multiplex. By reducing the amount of time it takes to acquire and display a tuned channel, fast channel change can improve a viewer's experience. In exemplary embodiments of the present invention, a fast channel change system can simultaneously decode channel data for each channel in a transport multiplex, reconstruct all access units for each channel and send them out on their respective channel stream in the order that each access unit completes to a streamer, store and maintain a minimum amount of channel data in a buffer in each streamer, and output channel data from a streamer corresponding to a tuned channel to a media player. In exemplary embodiments of the present invention data can be input to a de-multiplexer and divided into separate video and audio streams prior to being input to the media player. Exemplary embodiments of the present invention can be utilized in various video applications, such as, for example, Sirius Satellite Radio's Backseat TV™ service.

BRIEF DESCRIPTION OF THE DRAWINGS

FIG. 1 depicts a simplified system diagram of a conventional video player application without fast channel change;

FIG. 2 depicts the video player application of FIG. 1 augmented with an exemplary fast channel change system according to an exemplary embodiment of the present invention;

FIGS. 3 and 3A illustrate exemplary packets and access units according to an exemplary embodiment of the present invention;

FIG. 4 illustrates an exemplary key frame parking algorithm according to an exemplary embodiment of the present invention;

FIG. 5 illustrates an exemplary overall process flow according to an exemplary embodiment of the present invention;

FIG. 5A illustrates an exemplary overall process flow according to an exemplary embodiment of the present invention;

FIG. 6 illustrates an exemplary detailed process flow for an initialization of streamer output sub-process according to an exemplary embodiment of the present invention;

FIG. 7 illustrates an exemplary detailed process flow diagram for a modification of streamer output sub-process according to an exemplary embodiment of the present invention; and FIG. 8 illustrates detailed operation of an exemplary transport de-multiplexer according to an exemplary embodiment of the present invention.

DETAILED DESCRIPTION OF THE INVENTION

A system, method and computer program product are provided for fast channel change between logical channels within a transport multiplex. Exemplary embodiments of the present invention can be used, for example, in connection with any broadcast video system, such as, for example, Sirius Satellite Radio's Backseat TV™ service. By reducing the amount of time required to acquire and display a tuned channel via fast channel change, a viewer's experience can be significantly enhanced. The beneficial effects of such technology increase with the number of channels provided, thus allowing users to flip through many channels and effectively instantaneously see what each channel is offering.

For ease of description of various exemplary embodiments of the present invention, a few definitions will be provided. A logical channel is a set of associated video, audio, and related data (such as, for example, closed captioning) to which a viewer can tune via their television or TV-like device. An access unit is the smallest logical unit of data which can be displayed, or played, as the case may be, by the aforementioned devices (such as, for example, a video frame, an audio frame, a datum of closed captioning data, etc.). Packets are the smallest logical units of data which can be conveniently transmitted in and recovered from a digital television signal and contain either whole access units or a piece or pieces of one or more access units. A transport multiplex is a stream of one or more logical channels in which the video, audio, and data access units have been encapsulated into packets (i.e., packetized) and mixed together (i.e., multiplexed) for transmission. An entry point is any place in a stream of data for a particular channel where display may begin, such as for example, at a key frame in a video clip, such as, for example, an I-frame in an MPEG encoded video signal.

FIG. 1 depicts a simplified system diagram of an exemplary video player application without fast channel change. With reference thereto, a transport multiplex 105 is fed into a transport de-multiplexer 110. For convenience, a de-multiplexer will be sometimes referred to herein by the colloquial term "demux." Continuing with reference to FIG. 1, the transport demux 110 extracts the video, audio, and closed captioning packets which comprise a single channel 115—the one that is currently tuned to by a user—within the transport multiplex and reconstructs access units from those packets.

From there, the channel data 115 is fed into a media player 150, the software component which provides a control interface to the decoder hardware. The channel data 115 is passed into the media player 150 as a bundle of three separate streams (one for each of the video, audio, and closed captioning data) as necessitated by the internals of the decoder. Thus, in standard systems, the demux extracts only the channel data for one channel, and feeds only that data to the media player.

When a user tunes to a new channel, media player 150 is stopped, a new channel stream bundle is passed to the media player, and then the media player is started again. Stopping and starting media player 150 discards any remaining data (from the previously tuned channel) within the player, as the use of such data could result in visible or audible glitches on restart of the media player. There is generally no attempt to do splicing.

FIG. 2 depicts an exemplary video player application augmented with a fast channel change system according to an exemplary embodiment of the present invention. In the video player of FIG. 2 the transport demux 210 extracts the video, audio, and closed captioning packets which comprise all of the various channels within the transport multiplex 205. However, instead of extracting each channel's data as a bundle of three separate streams, the transport demux can, for example, export a single stream for each channel, shown as Channel 1, Channel 2 and Channel N in FIG. 2. Thus, the transport demux 210 can, for example, reconstruct all access units for the channel and send them out on the channel stream in the order that each access unit completes.

FIG. 3 depicts an example of the order in which access units can be reconstructed from packets for a given channel from the transport multiplex according to exemplary embodiments of the present invention. The top portion of the figure shows multiplexed packets and the bottom portion of the figure shows the ordered, reconstructed access units. As noted above, the order of the reconstructed access units sent on the channel stream by the transport demux is based on when the last piece of each access unit arrives at the transport demux, i.e., the completion order of the access units. This order is necessary for fast channel switching due to the timing relationships between the video, audio, and closed captioning data. FIG. 3A indicates which packets are assigned to which access units in the example of FIG. 3, and the fact that an access unit is only output once all of its component packets have been received.

Returning to FIG. 2, each channel stream can be fed, for example, into a fast channel change object ("FCC Object") 240 where it can be, for example, handled by a streamer 220. A streamer 220 can, for example, read data from its input, possibly process the data, and then write the data to its buffered output. In exemplary embodiments according to the present invention, the streamer's processing can, for example, be in either of two modes, as next described.

In a first mode, called a normal mode, the channel is the one to which a receiver is currently tuned (e.g., Channel 1 in FIG. 2). From that channel's streamer, channel data can be written to the streamer output starting at the first entry point the streamer encounters upon switching to this mode. The channel data can then, for example, be sent into a demux 230 to separate the data into video, audio, and closed captioning data streams (as required by the decoder) and then, for example, be sent to the media player 250. Alternatively, when interoperating with a media player that does not require a separate data stream for audio and video, such as, for example, Windows Media Player 9, the de-multiplexing at demux 230 is not needed. In a second mode, which can be called, for example, a parking mode, the streamer's channel is not the one to which the receiver is currently tuned (e.g., any of Channel 2 through Channel N in FIG. 2). In such parking mode channel data is not written to the streamer output, but rather, the streamer can, for example, store sufficient data in its internal buffer so as to insure no underflow at the media player in the event of a channel change to that streamer's channel. In exemplary embodiments of the present invention, in parking mode the streamer can, for example, store data beginning at the first entry point the streamer encounters upon switching to this mode.

Thus, in exemplary embodiments of the present invention, FCC Object 240 operates as to each channel continuously, either in normal mode or in parking mode.

When switching channels, for example, media player 250 can be stopped, the newly tuned channel's streamer 220 can be placed in normal mode, the previously tuned channel's streamer 220 can be placed in parking mode, and, finally, the media player can be started again. Unlike conventional non-fast channel change devices, the data path to the media player (i.e., from demux 230) remains unbroken.

In order to prevent the decoder from eventually starving—a condition called underflow—after a tune to its channel, a channel streamer in parking mode needs to maintain at least a certain amount of stored channel data. That minimum amount can be determined, for example, from buffering period information or coded packet buffer size present in the video data, or from system parameters such as, for example, media player data throughput for each channel.

FIG. 4 illustrates how an exemplary parking algorithm can work to maintain the minimum amount of channel data in a given parked streamer according to an exemplary embodiment of the present invention. The arrows in FIG. 4 indicate the entry points for the corresponding channel. An entry point is a key frame, i.e., one which allows the video signal to be displayed, thus a video frame that is not dependent upon earlier or later frames in order to be decoded. In MPEG a key frame is an I-frame, for example. Upon encountering an entry point, for example, a streamer's data processor can, for example, record the following information: (i) the entry point's starting position in the buffer; (ii) the minimum necessary amount of video data to store after the entry point; and (iii) how much non-key frame video data has been stored since the last entry point.

Upon encountering each successive entry point after the second one, inclusive, the algorithm seeks to maintain the minimum necessary amount of channel data in the streamer buffer by potentially discarding data stored previous to the entry point, starting at this latest entry point and working backwards to at most the second entry point. If the amount of video data (including both key frames and non-key frames) stored after the entry point (hence the need to keep track of the amount of non-video data stored between entry points) is sufficient to prevent underflow on a channel change, the data stored previous to the entry point is discarded. It is understood that such requisite minimum amount of data is in general channel specific, and thus needs to be determined for each channel.

Testing performed by the inventor has shown an improved average channel change time with fast channel change over conventional changing of channels without it. For example, in one test run on a multiplex with three video channels, where video was played in H.264 format and was MPEG encoded, a standard channel change involved six seconds before video from the newly changed channel appeared. When a fast channel change according to an exemplary embodiment of the present invention was implemented in the same system, the channel change delay was decreased to three seconds. Additionally, although exemplary embodiments of the present invention need to interoperate with particular media formats by definition, the fast channel change software's structure can be easily modified to handle any media format.

Because the present invention operates independently of how many channels are in a given multiplex, it is completely scalable to as many channels are desired, given a separate streamer with adequate buffering for each channel, and adequate channel capacity in a transport de-multiplexer or set of such transport de-multiplexers.

FIGS. 5-8, next described, depict exemplary process flow in an exemplary embodiment of the present invention implemented in software, for a video player designed for H.264 format video, and for a transport multiplex containing three logical video channels. In exemplary embodiments of the present invention such exemplary software can be stored, for example, on a digital signal processor running the video.

FIG. 5 is an overall process flow diagram for an implementation of an exemplary embodiment of the present invention. FIG. 5A is a more detailed depiction of a particular exemplary implementation. With reference thereto, at 510 a fast channel change object can, for example, first be created. Next at 520, a clock stream identifier can, for example, be created to handle data from a clock and to synchronize the data. At 530 in FIG. 5, the transport multiplex data can be, for example, sorted into channel streams. In the specific exemplary embodiment shown in FIG. 5A, stream identifiers associated with each of audio, video and closed captioning streams can be used to select the data and then these streams can be mapped to a channel stream within a transport multiplexer. Thus, at 531 in FIG. 5A, stream identifiers can be used, for example, as a way to distinguish data, such as audio, video, and close captioning data for each channel, and then at 535 in FIG. 5A, these streams can be, for example, mapped to a single channel stream (which looks like the bottom stream of FIG. 3). By mapping to a channel stream, the effect is to order the data based on completion time.

At 540, a buffer can store the amount of data needed to prevent underflow. Also at 540, starting the streamer output, can, for example, place a selected channel in normal mode and the other channels in parking mode. As noted above, in normal mode a channel's output can be sent to the media player. After a certain event, such as, for example, reaching the minimum amount of channel data needed in the buffer or a change in the channel, the media player decodes the data and displays the video at 550. If a user desires to change the channel, at 560, the new channel can, for example, be placed in normal mode and the previous channel can be placed in parking mode. In exemplary embodiments of the present invention the order of the mode changes can be to set the newly selected channel in normal mode and then set the previously selected channel to parking mode, thus leaving a very slight overlap where both channels are in normal mode. This can, for example, prevent glitches in the video and audio. After placing the newly selected channel in normal mode and placing the previously selected channel in parking mode, the new channel can, for example, now be displayed at 550. In the depicted exemplary embodiment, the new channel stream is displayed as long as the user prefers (until the channel is changed or the system is shut off).

FIG. 6 is a detailed flow diagram for the initialization of streamer output sub-process shown at 540 in FIG. 5. At 610 the stream can start, for example, by determining the number of channels. In exemplary embodiments of the present invention, the channel list can be dynamic, thus allowing for addition and subtraction of channels. Alternate exemplary embodiments could use a static channel list, in which case determining the number of channels might not be necessary.

Next at 620, a set of values can, for example, be associated with each channel (such as the value of the channel number). At 630 a default or user inputted channel can then be selected to be the initial output to the media player. Using the value of the channel selected, at 640 each channel can, for example, be placed into either parking mode or normal mode. The output of the normal mode stream can then be sent to the media player.

FIG. 7 depicts a detailed process flow diagram for the modification of streamer output sub-process illustrated at 560 in FIG. 5. At 710 a new channel, for example, can be selected by a user. At 720, the software can, for example, then locate the channel stream for the newly selected channel. In an exemplary embodiment, the software can locate the channel stream using a dynamically linked list. Therefore, the channel list can be updated dynamically, allowing for changes in the broadcast lineup. However, as noted, a static channel list can also be used, thus making searches for the channel stream in some instances faster. This can be done, for example, by using an array for access to the channel objects (streams) and a hashtable for lookup. Next at 730, the software can set the new channel to normal mode. At 740, the old channel can, for example, be set to parking mode. As noted, the order of the mode changes here can be important to prevent display glitches. The output of normal mode channel can then, for example, be sent to the media player.

FIG. 8 illustrates an exemplary operation of a transport de-multiplexer, such as that shown at 210 in FIG. 2, for example, according to an exemplary embodiment of the present invention. With reference thereto, data coming in from the transport multiplex can be separated into channel streams by a number of methods, such as, for example, using stream identifiers to separate the incoming data, and then to map the streams to their appropriate logical channel, ordering the data based on completion time. In addition, a clock stream can be added to the transport de-multiplexer. As noted, an exemplary output of a transport demux according to exemplary embodiments of the present invention is shown on the bottom section of FIG. 3. Another way to combine the access units would be, for example, to place time stamps on the access units using the clock stream as a method of organizing the data or as an error checking method, or alternatively, for example, to use time stamps which are already embedded in the access units.

Exemplary Source Code

Exemplary source code is provided in a computer program listing appendix on a compact disk (CD_ROM), in accordance with the provisions of 37 CFR. 1.96(c). The exemplary software source code extracts can be used, in exemplary embodiments of the present invention, to implement an embodiment of the present invention that utilizes an H.264 compliant video player, in a multiplex that has three video channels. It is understood that in different contexts modified source code would be used to conform to various video formats, the number of channels, the constraints of various video chips and video player systems, etc., as may be appropriate, and thus the following code is only one of a multitude of examples of source code that can, for example, be used to implement exemplary embodiments of the present invention. FIGS. 5-8 describe an exemplary embodiment created using the exemplary code provided in the computer program listing appendix, and thus can be useful for analyzing it. It is understood that the provided code is by way of illustration, and only provides certain illustrative functionalities. The exemplary source code excerpts provided in the computer program listing appendix, Appendix A, refer to an exemplary implementation of an embodiment of the present invention named "FAST_CHANNEL_CHANGE."

A sampling of the modules provided in the appendix are copied here for illustration:

Begin Exemplary Code

```
//Overall System
/Create Fast Channel Change Objects
fcc=getFastChannelChange( );
//Add Clock Stream Identifier
INF_PRINTF("Adding clock SID to demux.\n");
demux->addSID(demux, SDTP_CLOCK_SID, FIFO_UN-
    SYNCHRONIZED, SDTP_MAX_PAYLOAD_SIZE);
clockInput=demux->getSID(demux, SDTP_CLOCK_SID);
//Add Stream Identifiers For Each Channel In The Transport
De-multiplexer
INF_PRINTF("Adding SIDs to demux.\n");
demux->addSID(demux,    280,    FIFO_UNSYNCHRO-
    NIZED, SDTP_MAX_PAYLOAD_SIZE);
demux->addSID(demux,    281,    FIFO_UNSYNCHRO-
    NIZED, SDTP_MAX_PAYLOAD_SIZE);
demux->addSID(demux,    290,    FIFO_UNSYNCHRO-
    NIZED, SDTP_MAX_PAYLOAD_SIZE);
demux->addSID(demux,    291,    FIFO_UNSYNCHRO-
    NIZED, SDTP_MAX_PAYLOAD_SIZE);
demux->addSID(demux,    310,    FIFO_UNSYNCHRO-
    NIZED, SDTP_MAX_PAYLOAD_SIZE);
demux->addSID(demux,    311,    FIFO_UNSYNCHRO-
    NIZED, SDTP_MAX_PAYLOAD_SIZE);
demux->addSID(demux, 256, FIFO_PES, SDTP_MAX_
    PAYLOAD_SIZE*1024);
demux->addSID(demux, 257, FIFO_PES, SDTP_MAX_
    PAYLOAD_SIZE*1024);
demux->addSID(demux, 258, FIFO_PES, SDTP_MAX_
    PAYLOAD_SIZE*1024);
//Map Stream Identifiers To Channel Stream
demux->setSIDChannel(demux, 280, 256);
demux->setSIDChannel(demux, 281, 256);
demux->setSIDChannel(demux, 290, 257);
demux->setSIDChannel(demux, 291, 257);
demux->setSIDChannel(demux, 310, 258);
demux->setSIDChannel(demux, 311, 258);
channel1=demux->getSID(demux, 256);
channel2=demux->getSID(demux, 257);
channel3=demux->getSID(demux, 258);
//Set Initial Channel And Start Stream
fcc->setChannel(fcc, channels[channelIndex]);
fcc->start(fcc);
//Display Video
player->sendMediaCommand(player,    PLAYER_OPEN,
    FALSE, 1000);
player->sendMediaCommand(player,    PLAYER_PLAY,
    FALSE, 500);
//Change Channels And Display Video
fcc->tuneTo(fcc, channels[channelIndex]);
player->sendMediaCommand(player,    PLAYER_OPEN,
    FALSE, 1000);
player->sendMediaCommand(player,    PLAYER_PLAY,
    FALSE, 500);
//Parking Mode
    if((streamId==(U8) VIDEO_STREAM_ID) &&
        (iPRIVATE-
            >m_mode==FCC_H264_PARKING_MODE) &&
        (iPicturePresent==TRUE))
    {
        ULONG vbvLevel=iPRIVATE->m_accessUnit->buff-
            erSize(iPRIVATE->m_accessUnit);
        ULONG    fifoSize=iSUPERPRIVATE->m_fifo->get-
            Size(iSUPERPRIVATE->m_fifo);
        if(vbvLevel==0)
        {
            vbvLevel=fifoSize;
        }
//For every H.264 access unit containing an I-frame, store the
relevant data.
        node=iPRIVATE->m_iFrameList->insertAtTail(iPRI-
            VATE->m_iFrameList);
        ASSERT(node !=NULL);
        ((pIFRAME_NODE)    node)->m_writePointer=
            writePointer;
        ((pIFRAME_NODE) node)->m_vbvLevel=vbvLevel;
        ((pIFRAME_NODE)    node)->m_otherBytes=iPRI-
            VATE->m_otherBytes;
        iPRIVATE->m_otherBytes=0;
        numItems=iPRIVATE->m_iFrameList->numNodes(iP-
            RIVATE->m_iFrameList);
        bytesAvailable=iSUPERPRIVATE->m_fifo->get-
            BytesAvailable(iSUPERPRIVATE->m_fifo);
//Determine which I-frame meets the current VBV level cri-
teria if all preceeding H.264 frames in the FIFO were dis-
carded.
//Work backwards from the most recent I-frame.
        if(numItems>1)
        {
            node=iPRIVATE->m_iFrameList->getNodeByIndex
                (iPRIVATE->m_iFrameList, 0);
            wPtr1=((pIFRAME_NODE) node)->m_writePointer;
            for(i=(INT)(numItems-1); i>0; --i)
            {
                node=iPRIVATE->m_iFrameList->getNodeByIn-
                    dex(iPRIVATE->m_iFrameList, (ULONG) i);
                wPtrN=((pIFRAME_NODE)    node)->m_write-
                    Pointer;
                ASSERT(wPtr1 !=wPtrN);
//bA is the number of bytes in the FIFO that would be left if all
data before the I-frame being tested for parking was dis-
carded.
                if(wPtrN>wPtr1)
                {
                    bA=bytesAvailable-(ULONG)(wPtrN-wPtr1);
                }
                else
                {
                    bA=bytesAvailable-(ULONG)(wPtrN+fifoSize-
                        wPtr1);
                }
//Account for audio and any other bytes (closed captioning).
bA2 is the number of video bytes after and
//including the I-frame being tested for parking.
                bA2=bA;
                for(j=i; j<(INT)(numItems-1); ++j)
                {
                    node2=iPRIVATE->m_iFrameList->getNodeByIndex
                        (iPRIVATE->m_iFrameList, (ULONG)(j+1));
                    ASSERT(node2 !=NULL);
                    bA2-=((pIFRAME_NODE) node2)->m_otherBytes;
                }
//Account for audio and any other bytes (closed caption-
ing).
                bA2=bA;
                for(j=i; j<(INT)(numItems-1); ++j)
```

```
{
    node2=(PRIVATE->m_iFrameList->getNodeByIndex
        (iPRIVATE->m_iFrameList, (ULONG)(j+1));
    ASSERT(node2 !=NULL);
    bA2-=((pIFRAME_NODE) node2)->m_otherBytes;
}
if(bA2>=((pIFRAME_NODE) node}->m_vbvLevel)
{
    DBG_PRINTF("Channel%lu setting parked I-frame
        (%lu->%lu)(%lu).\n",
        iPRIVATE->m_channel, numItems, numItems-i,
        bA2);
    iSUPERPRIVATE->m_fifo->setReadPointer(iSU-
        PERPRIVATE->m_fifo, wPtrN, bA);
```

End Exemplary Code

While the present invention has been described with reference to certain exemplary embodiments, it will be understood by those skilled in the art that various changes may be made and equivalents may be substituted without departing from the scope of the invention. For example, various exemplary embodiments of the present invention may interoperate with, for example, a Windows Media 9 video player, or any other available video player, and thus whether a video stream is maintained as a multiplex of video, audio and closed captioning data, or is separated into three data streams, may be adjusted according to the context. Additionally, many modifications may be made to adapt a particular situation or material to the teachings of the invention without departing from its scope.

What is claimed is:

1. A method for fast channel change between logical channels within a transport multiplex, comprising:
    receiving a channel selection signal identifying a tuned channel;
    simultaneously decoding channel data for each channel in a transport multiplex;
    reconstructing all access units for each channel and sending them out to a streamer on their respective channel stream in the order that each access unit completes;
    outputting channel data from a streamer corresponding to the tuned channel to a media player; and
    for each non-tuned channel, storing and maintaining a minimum amount of channel data in a buffer in its streamer by:
    recording:
    each key frame's starting position in the buffer;
    a minimum necessary amount of video data to store after each key frame to prevent underflow in the event of a channel change to that channel; and
    a quantity of non key frame data stored since the last key frame,
    and
        discarding data stored previous to the last stored key frame if said quantity is greater than or equal to said minimum necessary amount, and otherwise
        discarding data stored previous to the second to last stored key frame if said quantity is less than said minimum necessary amount.

2. The method of claim 1, wherein said minimum necessary amount of channel data is channel specific, and is a function of at least one of buffering information present in the video data, media player throughput and packet size for that channel.

3. The method of claim 1, further comprising setting said tuned channel to a normal mode and setting all other channels to a parking mode.

4. The method of claim 1, wherein channel data for said tuned channel is written to that channel's streamer output, and channel data for all other channels is written to an internal memory in each of said non-tuned channels' streamers.

5. The method of claim 1, further comprising:
    receiving a channel selection signal identifying a newly tuned channel; and
    first outputting the stored data from the newly tuned channel's streamer to the media player, and then outputting newly received data from said newly tuned channel's streamer to the media player.

6. The method of claim 1, wherein channel data for the tuned channel is written to the streamer output starting at the first entry point the streamer encounters.

7. The method of claim 1, wherein channel data for the non-tuned channel is written to an internal streamer buffer starting at the first entry point the streamer encounters.

8. The method of claim 1, further comprising outputting channel data for the tuned channel to a de-multiplexer prior to sending said data to the media player.

9. The method of claim 3, further comprising:
    receiving a channel selection signal identifying a new tuned channel;
    setting said newly tuned channel to normal mode;
    outputting channel data from a streamer corresponding to the newly tuned channel to the media player, while maintaining the previously tuned channel in normal mode; and
    setting the previously tuned channel to parking mode.

10. A computer program product comprising a non-transitory computer usable medium having computer readable program code means embodied therein, the computer readable program code means in said computer program product comprising means for causing a computer to:
    receive a channel selection signal identifying a tuned channel;
    simultaneously decode channel data for each channel in a transport multiplex;
    reconstruct all access units for each channel and sending them out to a streamer on their respective channel stream in the order that each access unit completes;
    output channel data from a streamer corresponding to the tuned channel to a media player; and
    for all non-tuned channels, store and maintain a minimum amount of channel data in a steamer buffer by, as to each such non-tuned channel:
    recording:
    each key frame's starting position in the buffer;
    a minimum necessary amount of video data to store after each key frame to prevent underflow on a channel change to that channel; and
    a quantity of non key frame data stored since the last key frame,
    and
        discarding data stored previous to the last stored key frame if said quantity is greater than or equal to said minimum necessary amount, and otherwise
        discarding data stored previous to the second to last stored key frame if said quantity is less than said minimum necessary amount.

11. The computer program product comprising a non-transitory computer usable medium of claim 10, wherein said minimum necessary amount of data is a function of at least one of buffering information present in the video data, media player throughput and packet size for that channel.

12. The computer program product comprising a non-transitory computer usable medium of claim 10, further comprising setting said tuned channel is set to a normal mode and setting all other channels are set to a parking mode.

13. The computer program product comprising a non-transitory computer usable medium of claim 10, wherein channel data for said tuned channel is written to that channel's streamer output, and channel data for all other channels is written to an internal memory in each of said other channels streamers.

14. The computer program product comprising a non-transitory computer usable medium of claim 10, further comprising:
receiving a channel selection signal identifying a newly tuned channel; and
first outputting the stored data from the newly tuned channel's streamer to the media player, and then
outputting newly received data from said newly tuned channel's streamer to the media player.

15. The computer program product comprising a non-transitory computer usable medium of claim 12, further comprising:
receiving a channel selection signal identifying a newly tuned channel;
setting said newly tuned channel to normal mode;
outputting channel data from a streamer corresponding to the newly tuned channel to the media player, while maintaining the previously tuned channel in normal mode; and
setting the previously tuned channel to parking mode.

16. The computer program product comprising a non-transitory computer usable medium of claim 10, wherein channel data for the tuned channel is written to the streamer output starting at the first entry point the streamer encounters.

17. The computer program product comprising a non-transitory computer usable medium of claim 10, wherein channel data for the non-tuned channel is written to an internal streamer buffer starting at the first entry point the streamer encounters.

18. The computer program product comprising a non-transitory computer usable medium of claim 10, further comprising outputting channel data for the tuned channel to a de-multiplexer prior to sending said data to the media player.

19. A system for fast channel change between logical channels within a transport multiplex, comprising:
a transport de-multiplexer receiving a transport multiplex and outputting a data stream for each logical channel from a plurality of channels in a transport multiplex;
a set of streamers, being one for each logical channel in said plurality of channels, each said streamer having a streamer buffer and being communicably connected to an output data stream from the transport de-multiplexer;
a media player communicably connected to the output of each streamer;
and a data processor,
wherein in operation the data processor:
receives a channel selection signal identifying a tuned channel,
causes channel data from a streamer corresponding to the tuned channel to be output to a media player; and
for all non-tuned channels, stores and maintains a minimum amount of channel data in a streamer buffer by, as to each such non-tuned channel:
recording:
each key frame's starting position in the buffer;
a minimum necessary amount of video data to store after each key frame to prevent underflow on a channel change to that channel; and
a quantity of non key frame data stored since the last key frame,
and
causing the discarding of data stored previous to the last stored key frame if said quantity is greater than or equal to said minimum necessary, and otherwise
causing the discarding of data stored previous to the second to last stored key frame if said quantity is less than said minimum necessary amount.

20. The system of claim 19, wherein each streamer also has a streamer data processor, and the data processor sends signals to said streamer data processors to cause said channel data from a streamer corresponding to the tuned channel to be output to a media player and to cause said minimum amount of channel data to be stored in a buffer in each streamer for each of the non-tuned channels.

21. The method of claim 19, wherein said minimum necessary amount of video data stored includes both key frames and non-key frames.

* * * * *